June 22, 1948.  F. H. OSBORNE  2,443,925
SELECTOR DEVICE FOR VENDING MACHINES
Filed June 25, 1947  11 Sheets-Sheet 1

INVENTOR.
FRED H. OSBORNE.
BY
Lockwood, Goldsmith & Galt,
ATTORNEYS.

June 22, 1948. F. H. OSBORNE 2,443,925
SELECTOR DEVICE FOR VENDING MACHINES
Filed June 25, 1947 11 Sheets-Sheet 2

FIG. 3

Inventor.
FRED H. OSBORNE.

By Lockwood, Goldsmith & Galt.
Attorneys.

June 22, 1948.  F. H. OSBORNE  2,443,925
SELECTOR DEVICE FOR VENDING MACHINES
Filed June 25, 1947  11 Sheets-Sheet 4

INVENTOR.
FRED H. OSBORNE.
BY
ATTORNEYS.

June 22, 1948.  F. H. OSBORNE  2,443,925
SELECTOR DEVICE FOR VENDING MACHINES
Filed June 25, 1947  11 Sheets-Sheet 6

INVENTOR.
FRED H. OSBORNE.
BY
Lockwood, Goldsmith & Galt.
ATTORNEYS.

June 22, 1948.　　　　F. H. OSBORNE　　　　2,443,925
SELECTOR DEVICE FOR VENDING MACHINES
Filed June 25, 1947　　　　　　　　　　11 Sheets-Sheet 8

FIG. 19

INVENTOR.
FRED H. OSBORNE.
BY
Lockwood, Goldsmith & Galt.
ATTORNEYS.

June 22, 1948.  F. H. OSBORNE  2,443,925
SELECTOR DEVICE FOR VENDING MACHINES
Filed June 25, 1947  11 Sheets-Sheet 9

Inventor.
FRED H. OSBORNE.

June 22, 1948.  F. H. OSBORNE  2,443,925
SELECTOR DEVICE FOR VENDING MACHINES
Filed June 25, 1947  11 Sheets—Sheet 11

Inventor.
FRED H. OSBORNE.
By Lockwood, Goldsmith & Galt.
Attorneys.

Patented June 22, 1948

2,443,925

UNITED STATES PATENT OFFICE 2,443,925

SELECTOR DEVICE FOR VENDING MACHINES

Fred H. Osborne, Snyder, N. Y., assignor to The Rudolph Wurlitzer Company, Chicago, Ill., a corporation Application June 25, 1947, Serial No. 757,050

20 Claims. (Cl. 171—97)

This invention relates to an improvement upon selector devices for vending machines, more especially for controlling an automatic phonograph as a program selector, reference being had to the copending applications for Letters Patent filed by Raymond C. Haimbaugh March 15, 1945, Serial No. 582,915, entitled "Selector mechanism," and filed by Paul M. Fuller August 17, 1945, Serial No. 610,958, entitled "Remote control selector device."

It is the object of the invention to provide a compact selector device such as may be mounted on a vending machine or phonograph cabinet in a minimum of space, attractive in appearance, and with such operating appeal as to attract customers. It is similarly applicable for use as a remote control, as well as a local control, for selecting records to be played by a phonograph. For that purpose it may be embodied in or comprise the usual remote selector wall box, as commonly employed for remote program selections for phonographs or as a counter box to be used for the same purpose. Thus, the selector device of this invention may be an exceptionally compact unit for selecting as many as twenty-four phonograph records or other units of merchandise, the operation of which promotes interest for attracting customers, such as to cause a phonograph or vending machine to be more freely patronized than with the usual type of selector.

The invention contemplates a selector device having a series of program panels controlled by a program key which, upon being depressed by the customer, will automatically cause a different program panel to be brought into view. For example, wherein there are twenty-four phonograph records available for play, there may be three pairs of panels each pair bearing the names and corresponding numbers of eight selections, only one pair of panels in view at a time, and upon depressing the program key the next succeeding panels will be automatically brought into view for program selection. Associated with the exposed panels there are a corresponding number of selector keys, one for each selection as numbered on the exposed panels and associated with a pair of number panels, which automatically changes numbers to correspond with the numbers of the exposed program panels. Wherein there are eight selections carried by each of the three pairs of program panels, to make twenty-four selections in all, there will be a corresponding series of eight selector keys, each associated with the eight numbers on the exposed number panels. Upon depressing the program key, the program panels and the number panels will be automatically brought into view to enable a selection to be made from the exposed panels by the corresponding selector keys.

The full nature of the invention will be understood from the accompanying drawings and the following description and claims:

In the drawings there is shown a selector device for a vending machine or phonograph of a character to make twenty-four record or commodity selections, the device being herein shown as embodied in a housing 10 of a character to be installed upon a counter, or, with slight modifications, such as may be employed as a wall box for remote control. In place of being mounted within the housing 10, the device may be incorporated directly upon a phonograph or vending machine cabinet.

As shown in this modification, a housing is provided with clear plastic windows 11 to permit viewing of program panels 12. The program panels 12 exposed through the respective windows 11 are adapted to carry the names of records or commodities to be selected by inserting name strips in suitable holders in the usual manner, there being provided a designating numeral 13 adjacent the end of each of the name strip holders. Immediately above the panels there is the usual coin entrance slot 14 through which a coin may be deposited for operation of the phonograph or vending machine in the well known manner. Immediately below and forwardly of the program panels there are corresponding number panels 15 each carrying a group of numbers to correspond with the numbers 13 appearing opposite the name strip holders of the program panels. Directly below and in line with the respective numbers of the number panels 15 there is a series of selector keys 16, each key being adapted to be depressed for selecting the phonograph record or commodity identified by the number immediately above the key and as numerically shown in the program panel. Between the selector keys 16 there is a program key 17 adapted to be pressed downwardly to automatically change the program panels, and with them the number panels to present a new series of record selections or commodities for selection by the selector keys 16.

Herein illustrated each program panel exposes to view four selections, making eight in all. Consequently the number panels each expose the corresponding four figures of the program panels, respectively. In association with each there are four keys for each program and number panel. To increase the number of selections available there may be any reasonable number of program and number panels made available by depressing the program key 17, there being herein illustrated three sets of said panels to present twenty-four selections, the eight selector keys acting to select a record for play or dispense a designated commodity, depending upon the particular selector key depressed and the particular program panels brought to view. The selector mechanism is electrically connected through a cable 18 with an electrical source of power and the machine to be selectively controlled, all in the usual and well known manner.

Figure 2:
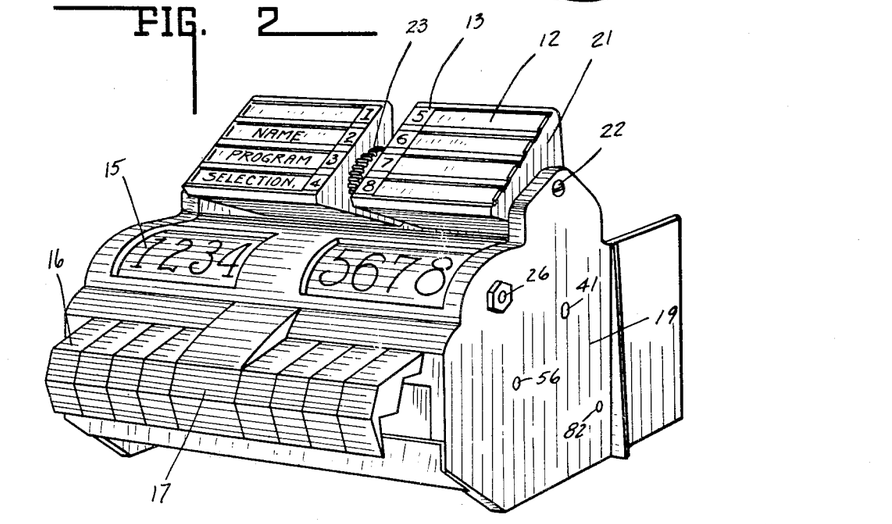
Fig. 2 is the same as Fig. 1, showing portions of the housing removed.
Figures 12, 17, 18:
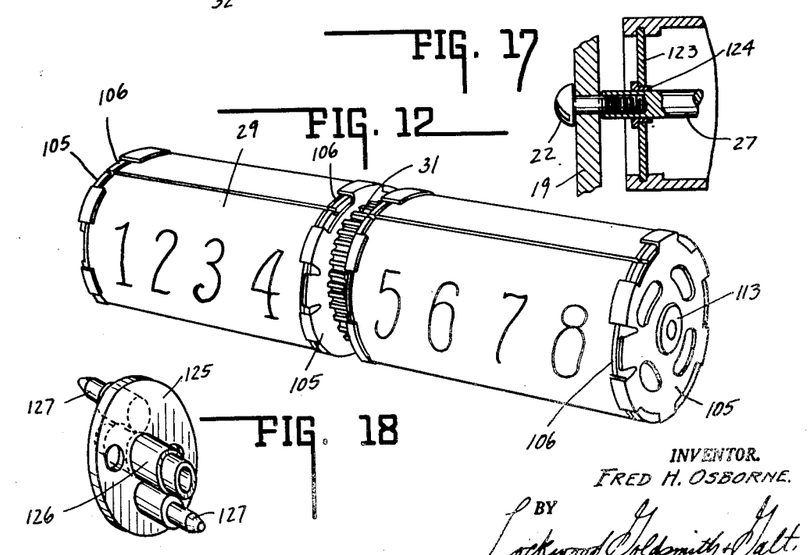
Fig. 12 is a perspective view of the number panel cylinders.
Fig. 17 is a central vertical section through an end portion of one of the program panel prisms.
Fig. 18 is an isometric view of the driving connection between the program panel prisms.

As shown in Fig. 2, the mechanism is supported within the housing of a phonograph cabinet upon the end plates 19. The program panels 12 comprise three sides of each of a pair of prisms 21 which are rotated about a bearing support in the end walls 19 comprising a screw 22 (Fig. 17), being selectively rotated to present selected panels by a gear 23 secured on a shaft carrying the opposite prisms. As hereinafter described, the prisms may be readily removed for enabling the convenient changing of selections through inserting name bearing cards in the several holders thereof. The number panels 15 are illuminated, being mounted upon a cylinder 24 carried by a shaft 25 (Fig. 3) having its end bearings mounted in the end plates 19 as indicated at 26.

The prisms 21, together with their driving gear 23, are carried on a shaft 27 and are driven by the gear 23 which meshes with an idler gear 28 which in turn meshes with a master gear 29 rotatable with a shaft 30 and meshing with a gear 31 which drives the shaft 25 which carries the number panel cylinders 24. The master gear 29 is twice the diameter and has twice the number of teeth as its driven gears 27, 28 and 31, whereby upon a one-sixth revolution of the master gear 29, the prisms 21 and the cylinders 24 will be simultaneously rotated a one-third revolution to expose to view the next following program and number panels, respectively.

Figure 3:
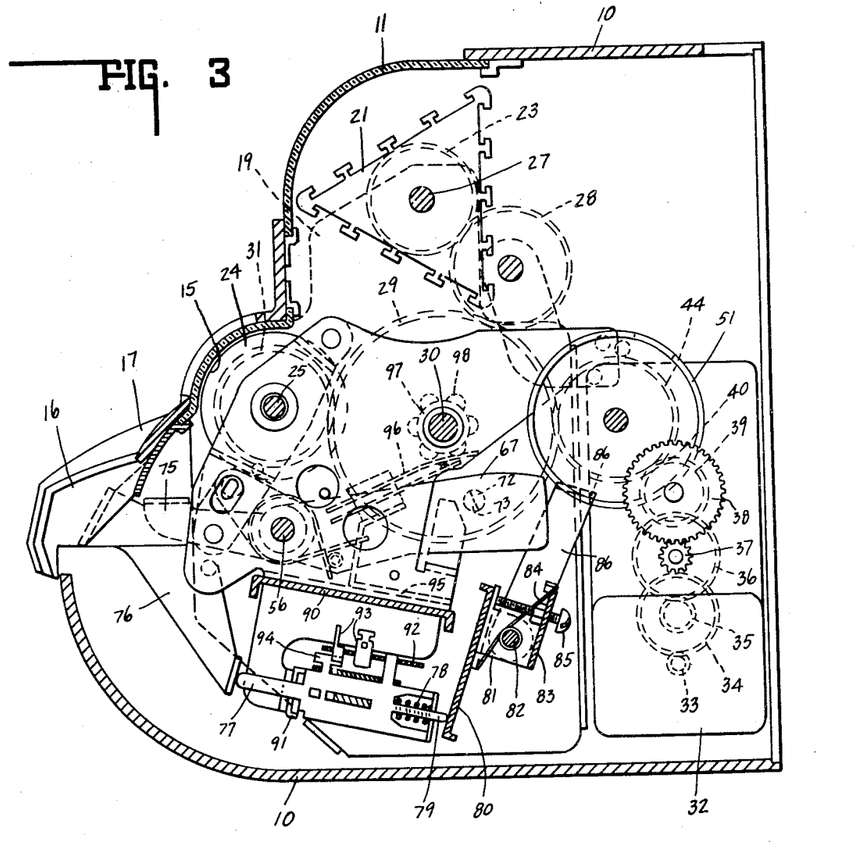
Fig. 3 is an end elevation of the operating mechanism with portions of the housing and frame structure shown in section.
Figures 10, 11, 16:
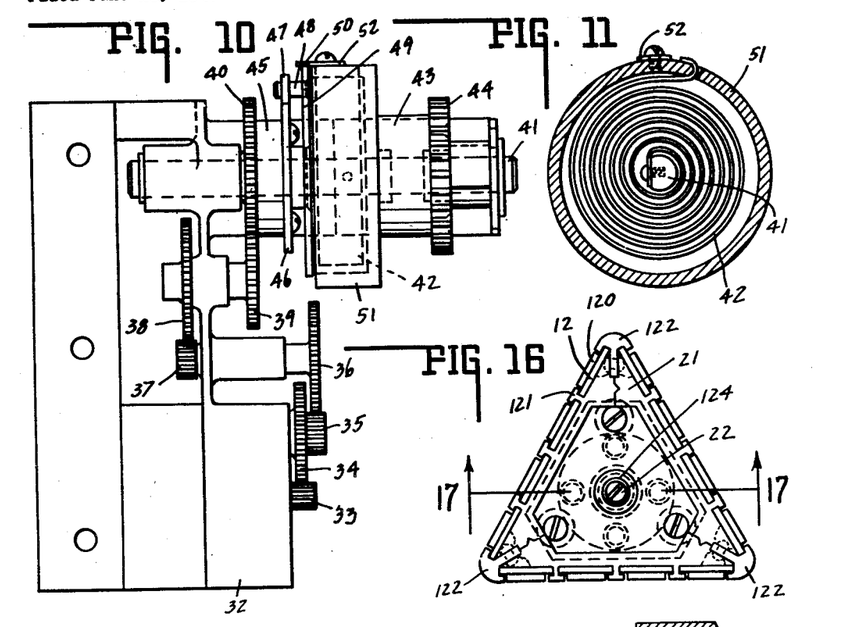
Fig. 10 is an elevation of the driving motor with its train of gears and clock spring drive.
Fig. 11 is a cross sectional view through a clock spring drive and its housing.
Fig. 16 is a section taken on the line 16—16 of Fig. 15.

The master gear 29 is controlled by an escapement mechanism to be partially rotated by a clock spring which is energized by an electric motor 32 having a driving shaft and pinion 33, and driving gear 34. Gear 34 carries a pinion 35 which drives gear 36. It in turn has a pinion 37 which drives gear 38. Gear 38 carries a pinion 39 which drives gear 40 (Figs. 3, 10). Gear 40 turns a shaft 41 which carries the inner end of a clock spring 42 (Figs. 10 and 11), which in turn through escapement mechanism to be hereinafter described, rotates the shaft 43 and gear 44. Gear 44 meshes with the master gear 29. In this respect it is to be noted that in Fig. 3 gears 40 and 44, being of the same diameter and number of teeth, are disposed one behind the other. Gear 44, and consequently the master gear 29, is driven by the clock spring 42 through the gear 40 which in turn is driven through the intermediate train of reduction gears from the motor 32.

Said gear 40, which is connected to the shaft 41, is provided with a hub 45 (Fig. 10) to which is fastened a circular plate 46 having a lug 47 extending outwardly from its periphery. In the path of the lug 47 there is a stud 48 riveted to a second circular plate 49 having a peripheral lug 50 similar to the lug 47. The clock spring housing 51 carrying the clock spring 42 lies in abutment against the plate 49, said housing carrying a projecting plate 52 extending in the path of the lug 50. The spring housing 51 is secured to the gear 44 through the hub 43, and as it meshes with the master gear 29 it is held from revolving by the escapment mechanism hereinafter described. Thus, when the spring 42 is fully wound, its torque is exerted against the escapement mechanism which, upon actuation, allows the gear 44 and the master gear 29 to advance part of a revolution, partially unwinding the clock spring 42. Said clock spring is calculated to permit escapement five times before the power stored in it is exhausted. However, two complete turns of the shaft 41 driven through the speed reduction gears from the motor 32 are required to restore the spent power of the clock spring.

Immediately upon expenditure of any part of the power stored in the clock spring 42, motor 32 is caused to drive the shaft 41 to rewind the spring. Wherein the spring may be completely unwound, lugs 47 and 50 are substantially 360 degrees distant from their wound up position. The gear 40 revolves the shaft 41 until the lug 47 encounters its stud 48, completing one revolution of the rewinding movement. The stud 48 carries the lug 50 through another revolution until the latter encounters the plate 51. Since the plate 52 is secured to the housing 51, which in turn is kept from revolving by reason of the gear 44 being restrained through the master gear 29 and the escapement mechanism thereof, the rewinding operation is halted. The motor 32 is stalled, but as it is designed for that event it is always in readiness to begin the rewinding operation immediately upon release of spring 42. A switch to start the motor 32 when the spring 42 is nearly unwound, and to stop said motor when wound, or nearly so, may be readily inserted in the circuit of said motor, should conditions warrant.

To change the program shown on the exposed panels 12, and the corresponding number panels 15, the program key is pressed which rotates the program panel prisms a one-third revolution to bring up the next succeeding panels, and simultaneously rotates the cylinders 24 to expose for view the next succeeding number panels thereon. For that purpose their respective gears 23, 31 are rotated a one-third revolution through rotation of the master gear 29 a one-sixth revolution. This is accomplished through the following described escapement mechanism.

The program key 17 is mounted on a supporting arm 55 (Figs. 4, 5) pivoted upon a shaft 56 carried by a frame member 57. Said arm 55 is connected by an adjusting screw 59 for adjustable connection with an actuating plate 60 which is also pivotally mounted on the shaft 56. Said plate 60 carries a laterally extending stud 61 which serves to anchor one end of a return spring 62, the other end thereof being anchored to a stud 63 in the frame member 57. By means of the screw 59 the initial tension of the spring 62 is regulated. The actuating plate 60 also bears a stud 64 against which bears one end of a torsion spring 65 wrapped around the shaft 56 with its opposite end bearing upon a stud 66 secured to an escapement arm 67 which is likewise pivoted upon the shaft 56.

Through the spring 65 motion is imparted to the escapement arm 67 whenever the key 17 is depressed, excepting when the escapement arm is prevented from rising against tension of spring 65. When it is prevented from rising, as hereinafter described, said spring 65 permits depression of the key 17 without movement of the escapement arm to thereby prevent damage to the mechanism should one attempt to use force to depress said key while the selecting mechanism hereinafter described is in operation. The spring 64 acts to bias the program key 17 to normal position after being actuated.

Figure 4:
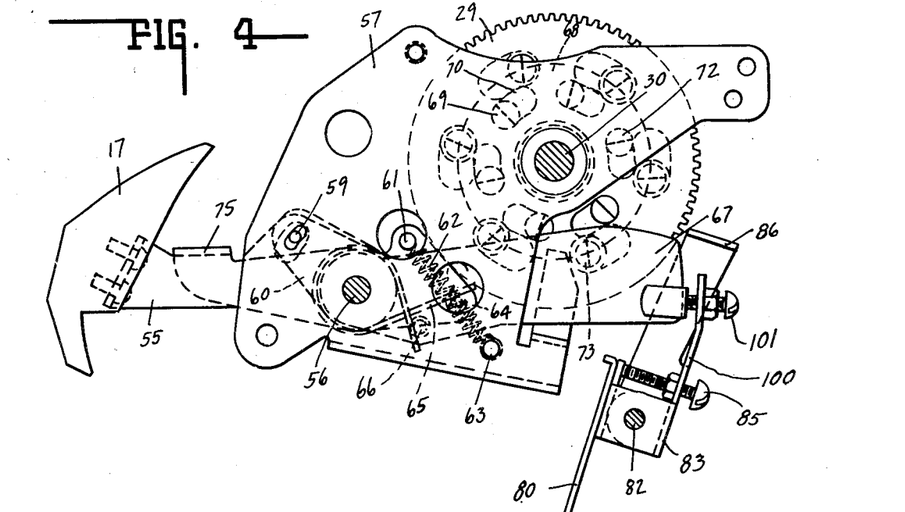
Fig. 4 is an end view of the program selector mechanism in normal position with parts broken away.
Figure 5:
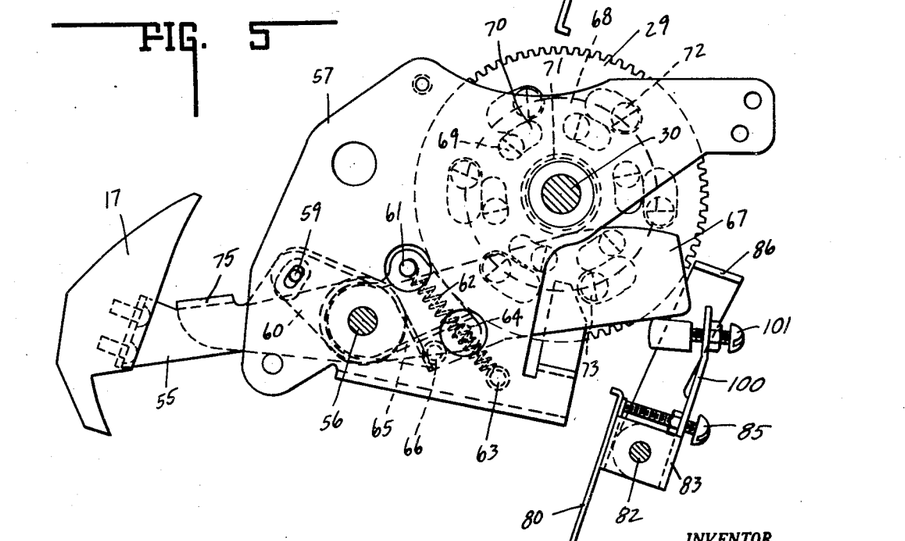
Fig. 5 is the same as Fig. 4, showing a program changing mechanism in operating position.

When the program change is permitted by freedom of movement of the escapement lever 67, it is normally in the position shown in Fig. 4. When it is actuated by depressing the key 17, it is moved to the position shown in Fig. 5. But when said escapement arm is restrained during the selection operation, the actuating arms are in the position shown in Fig. 6, with the spring 65 permitting the actuating movement thereof, but yielding under the restraint of the escapement lever 67. The escapement mechanism is designed to permit the master gear 29 to be revolved one-sixth of a revolution to rotate the program prisms and number cylinders one-third of a revolution and expose the next following panels. The gear 29 is mounted to rotate with the shaft 30, and adjacent thereto there is provided an escapement wheel 68 freely rotatable about said shaft, but restrained to a short arc by reason of its escapement studs 69 passing through arcuate slots 70 in gear 29. There are provided six such slots and studs extending equidistant from each other in an outer circular path. For absorbing shock, a spring 71 (Fig. 7) has one end secured to the shaft 30 and the other end connected to the escapement wheel 68. Said spring 71 urges the studs 69 toward one end of their respective slots 70 in the gear 29 and serves to cushion the shock of suddenly stopping the mechanism supported by the shaft 30 when escapement takes place.

The gear 29 is provided with an annular series of escapement studs 72 extending laterally therefrom and arranged in spaced outer circular formation. On the escapement arm 67 there is an inwardly extending stud 73. Each of the studs 69, 72 and 73 is formed with a flat contact face extending toward each other so that their flat faces come in contact as they perform their function. The circular series of studs 72 are arranged so that their flat faces encounter the flat face of the stud 73 on the escapement arm 67 as the gear is caused to revolve. The studs 69 are arranged in a smaller circle than the studs 72 and are angularly spaced therefrom so that said gear may advance a partial revolution before being stopped through the encounter of stud 73 on the escapement arm with the stud 69 on the escapement wheel when said arm is moved upwardly to shift its stud 73 from the path of the outer studs 72 into the path of the inner studs 69. When the key 17 is released and the escapement arm is returned by the spring 64, the stud 73 is then withdrawn and shifted from contact with one of the inner studs 69 to engagement with one of the outer studs 72, thereby arresting further rotation of the gear 29 after one-sixth of a revolution thereof. Such one-sixth revolution will have had the effect of shifting the program and number panels, as above described.

Figures 6, 7, 8, 9:
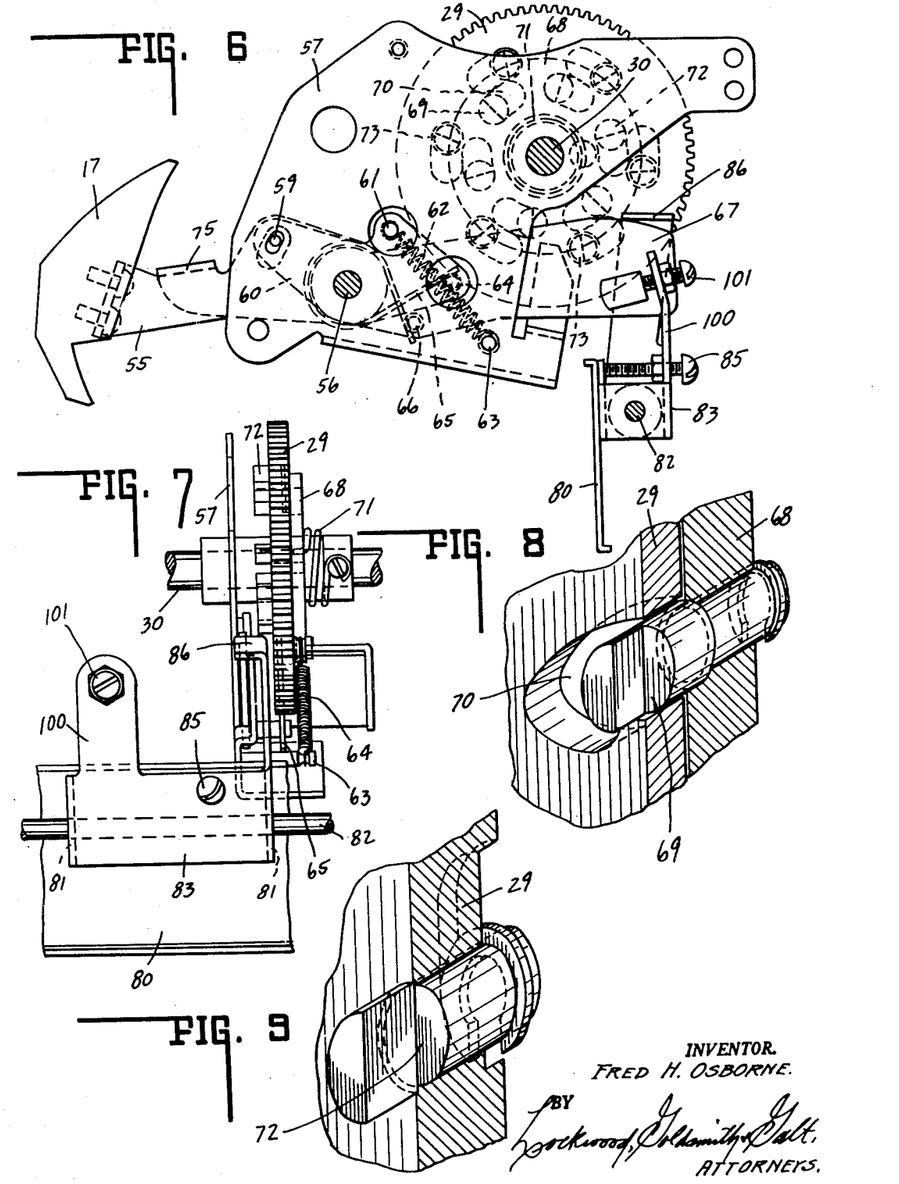
Fig. 6 shows a portion of the program changing mechanism as in Fig. 4, locked against operation during selection.
Fig. 7 is a rear elevation of the mechanism shown in Figs. 4 and 5.
Fig. 8 is an enlarged isometric view of one of the escapement studs shown partially in section.
Fig. 9 is an enlarged isometric view of one of the outer escapement studs shown partially in section.

In making a selection from the exposed program panels, one of the selector keys 16 is depressed. Each of said keys is attached to an arm 75 (Fig. 3) pivoted on said shaft 56 and having a downwardly extending abutment 76 abutting against the forward end of plunger 77 urged forwardly by the spring 78. The rear end 79 of the plunger 77 bears against a plate 80 supported pivotally by the lugs 81 on a shaft 82, the latter extending between the end frames 19 and having its bearing therein. An oscillating member 83 supported upon the shaft 82 between the lugs 81 is urged forwardly by a spring 84 and is adjustably spaced from the plate 80 by an adjusting screw 85. Extending upwardly from the oscillating member 83 there is a hook 86 which acts to move over the escapement lever 67 to lock it against movement to prevent shifting of the program when a selection is being made, as shown in Fig. 6. Thus, the escapement arm 67 extends rearwardly from the shafts 56 to normally lie below the path of movement of hook 86. When a selector key 16 is depressed, abutment 76 presses plunger 77 inwardly, causing its rear end 79 to strike the plate 80, oscillating it upon the shaft 82 to swing the hook above the escapement arm 67, thereby preventing it from rising.

Figure 14:
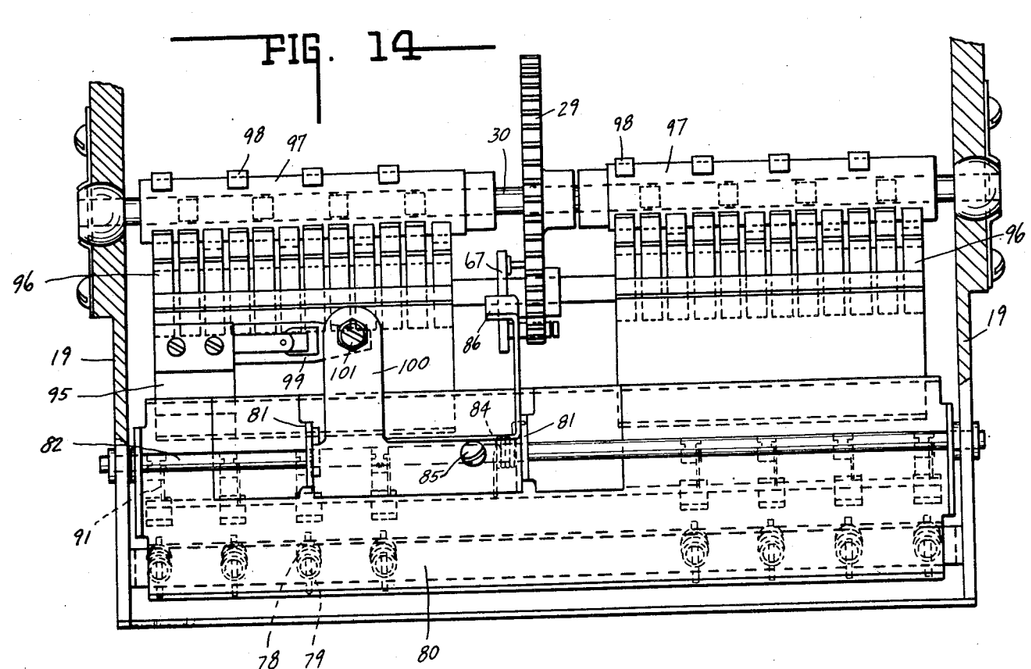
Fig. 14 is a rear elevation of the switch control mechanism, including the driving mechanism with elements thereof removed.

Extending between the end frames 19 there is a bridge member 90 which supports a well known mechanism containing a gang of eight switches 91 (Figs. 3 and 14). The switches are mounted on the plungers 77 and consist of a stationary insulating member 92 attached to a frame work supporting the contacts 93. The latter are bridged by contact 94 when the plunger 77 is advanced. Supported upon the upper surface of the bridge member 90 there is a bracket 95 supporting a gang of twenty-four selector switches 96, or one switch for each selection.

For actuating the selector switches 96 the shaft 30 carries a sleeve 97 upon which there is a series of forty-eight lobes 98 forming a multi-lobe cam. Said lobes are aligned with the respective switches 96 for closing said switches when engaged therewith. Said lobes are located in six axial rows spaced 90 degrees apart, eight lobes to a row, so that at any one time only one-third of the lobes are pressing one-third of the switches to closed position (Figs. 3 and 14). The switches 96 have their lower contact leaves grouped in threes, each group being connected to one contact 93 of the plunger actuated switches 91. The other contact 93 of each of said switches is connected to a master switch 99. Switch 99 is closed by a striker 100 which is integral with the hook 86 and is provided with an insulating head 101.

When the multi-lobe cam 98 is set to close eight of the leaf switches 96 corresponding to the eight selections of the exposed panel and a selector key 16 is depressed, its plunger 77 causes contact 94 to bridge the contacts 93, and simultaneously therewith causes the striker 100 to close the master switch 99. Thus, a circuit is established through the master switch and the switch 96 of the group of three which has been closed by the lobed cam in accordance with the particular program panels presented. The circuit thereby selectively closed is adapted to energize an electromagnet or other selecting device on the machine to initiate the selection of a record or commodity in the usual and well known manner. However, during this selecting operation it is necessary to prevent a change of program. For that purpose the hook 86 is swung above the escapement arm 67 to restrain it, so that escapement cannot take place while the selecting switch is active. On the other hand, the rear end of the escapement arm 67 is raised into the path of the hook 86 when the program is being changed so that the master switch 99 cannot be closed while the program change is proceeding.

Figure 13:
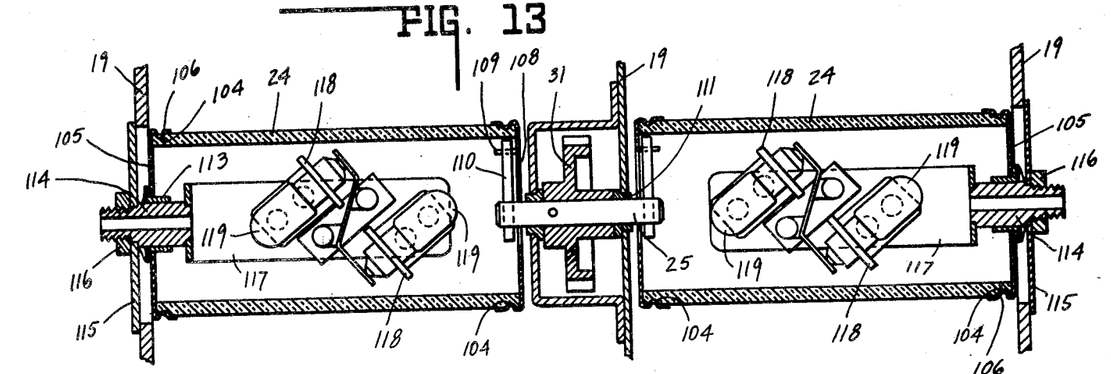
Fig. 13 is a longitudinal section through the number panel cylinders.

The cylinders bearing the number panels shown in Fig. 13 are arranged in end to end spaced relation and are preferably made of three segments of transulscent plastic which may be of different colored material so that each panel presents a different color when illuminated. At each end of the cylinders 24 there is a peripheral groove 104. A cap 105 is stamped of sheet metal with in-bent lugs 106 having indentations adapted to snap into the peripheral groove 104. The caps mounted over the adjacent ends of the cylinders are slotted radially at 108 and provided with a pair of in-bent lugs 109 adapted to embrace a pair of driving pins 110 extending radially from the shaft 25. Said shaft is supported on the bearings 111, one of which is set in the frame 19, the other being supported in a sub-frame 112 attached thereto. Between frame 19 and sub-frame 112, the gear 31 is secured to the shaft 25. Into each of the end caps 105 there extends a small bearing sleeve 113 which surrounds and revolves upon the tube 114. The latter, at its outer end has a shoulder which bears against the inner face of a mounting plate 115 and a threaded portion upon which is screwed a lock nut 116. The plate 115 is removably attached to the end frame 19 in any suitable manner.

The inner end of the tube 114 has riveted thereto a supporting plate 117 which is L-shaped, it being secured to the tube 114 at its shorter leg. The longer leg extends axially through the greater part of the length of the cylinder 24 to which there are riveted the lamp supporting members 118 arranged to face the number viewing aperture in the housing 10. Each of said lamp supports is adapted to carry a lamp 119 for illuminating said cylinders, an electrical connection thereto extending through the tube 114 about which the cylinder revolves. The above description in respect to one of the cylinders is similarly applicable to the other said cylinder.

Figure 15:
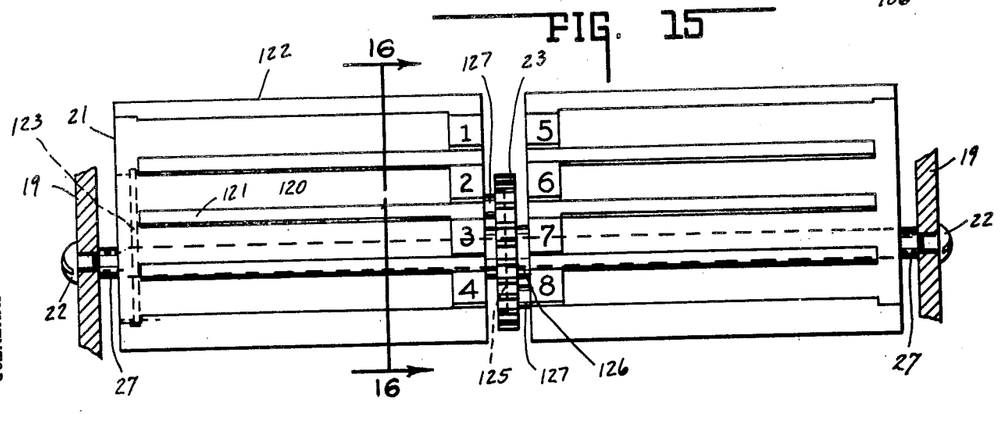
Fig. 15 is a front elevation of the program panel prisms.

The program panels 12 are carried on a pair of end abutting and aligned prisms 21, as shown in Figs. 15 and 16, the prisms being triangular in cross section to provide three panels each. Each panel, as herein shown, is designed to carry four name cards each, said name cards being designated at 120 insertable between the holding strips 121 extending longitudinally over the face of each panel. The panels are secured together by the molding strips 122 extending along the adjacent edges of each panel. Each of said prisms is provided with a supporting end plate 123 having a bushing 124 rotatable on the shaft 27, said shaft being removably secured to the end plates 19 by the supporting screws 22. The driving gear 23, driven by the idler 28 (Fig. 3) is rotatably mounted on the shaft 27 intermediate the two prisms, and has secured thereto a driving disk 125 (Fig. 18) supported by a central tube 126 on said shaft, which tube has a reduced shoulder portion for suitably spacing apart the inner end plates 123 of the prisms. Said inner end plates are each provided with an aperture into which oppositely extending driving pins 127 extend through which the prisms are driven by the driving member 125 upon rotation of the gear 23.

Figure 1:
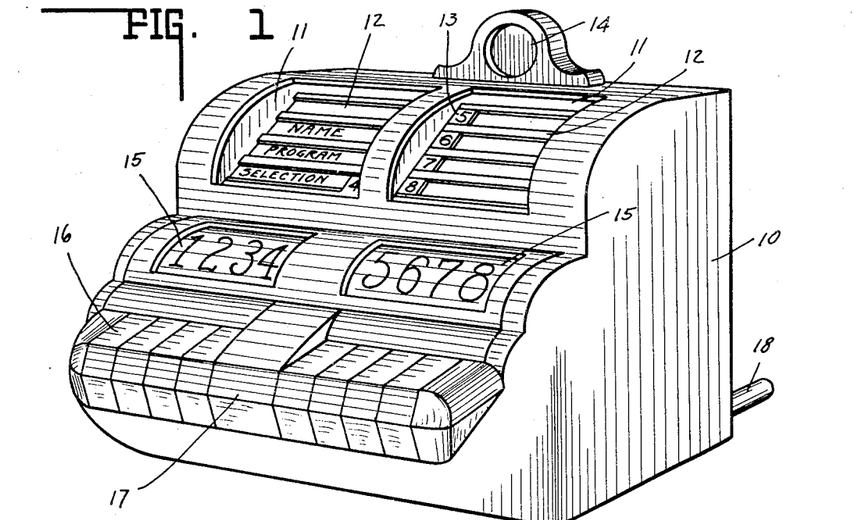
Fig. 1 is a perspective view showing a counter type of selector device.

In operation, and as shown in Fig. 1, the customer may observe the eight selections named on the exposed program panels 12. If one of those eight is to be selected the key 17 directly under the corresponding number on the number panel is depressed. This action closes the switch 91, at the same time causing the hook 86 to lock down the escapement lever 67 so that no program change will result if the customer depresses the program key 17. This action simultaneously closes the master switch 99 which makes a circuit through the closed program switch 96 of the group of three such switches, as determined by its engaging lobe 98 in accordance with the exposed program panels. The circuit thus closed actuates the selecting device, such as an electromagnet, through the cable 18 to set the machine for playing the corresponding record or dispensing the corresponding commodity unit. If the same selector key 17 is depressed with another program panel exposed, a different selection will be made by reason of a different one of the group of three switches 96 being closed by a different lobe 98 corresponding to the program panel then exposed.

In event the customer does not choose one of the selections shown on the exposed panels, the program key 17 may be depressed, which automatically rotates the program prisms 21 and the program number cylinders 24 one-third of a revolution to expose the next following panels carried by the prisms, and the next following corresponding program numbers carried by the number cylinders. This action causes the corresponding lobes 98 to release the previously closed switches 96 to close another one of the group of three switches so that a different and corresponding record or commodity unit will be selected through the newly closed switches 96 upon depressing one of the selector keys. However, during this program changing action, the escapement lever 67 will have been raised, thereby locking out movement of the hook 86 which holds open the master switch 99 so that the selecting circuit through the selector switches 91, 96 is held open. There having been power stored up from the motor 32 within the clock spring 42, upon release of the program key 17 after having been depressed, the escapement arm 67 will be returned, withdrawing its stud 73 from engagement with an inner stud 69 to permit gear 29 to rotate one-sixth of a revolution until its next outer stud 72 is brought into engagement with the stud 73. One-sixth of a revolution of the gear 29 rotates the gears 23 and 31 one-third of a revolution to change the program and number panels, as above described. Simultaneously therewith a corresponding set of lobes 98 are moved into closing engagement with a corresponding set of selector switches 96 in accordance with the newly presented program.

Figure 19:
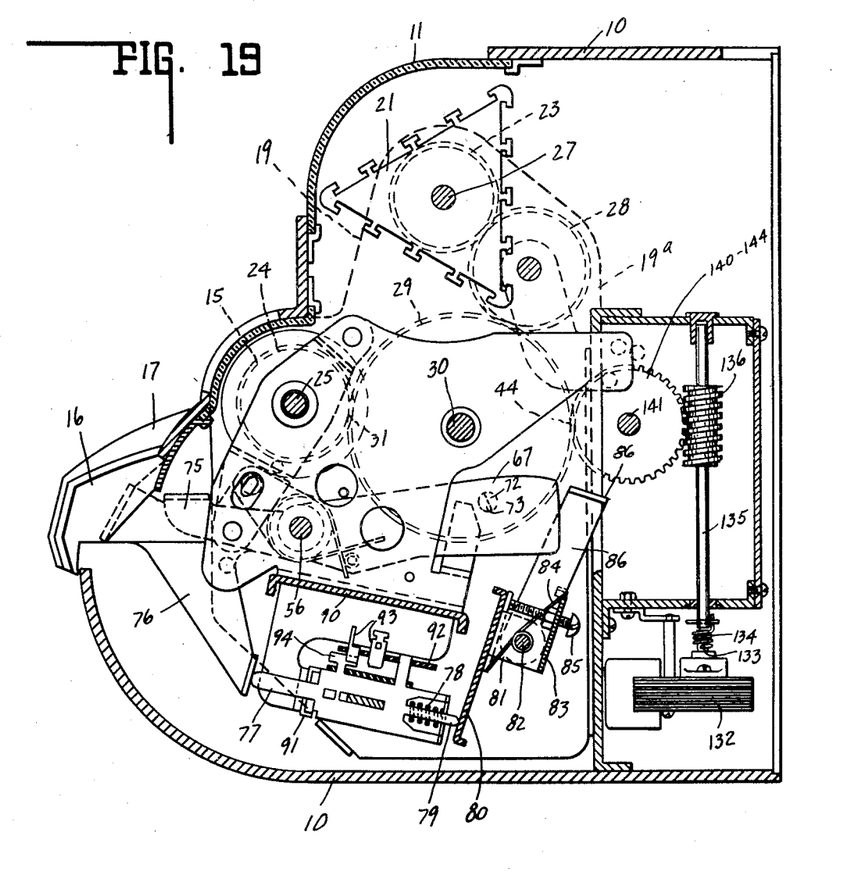
Fig. 19 is the same as Fig. 3 showing a modified form of power drive and cut off.
Figures 20, 21:
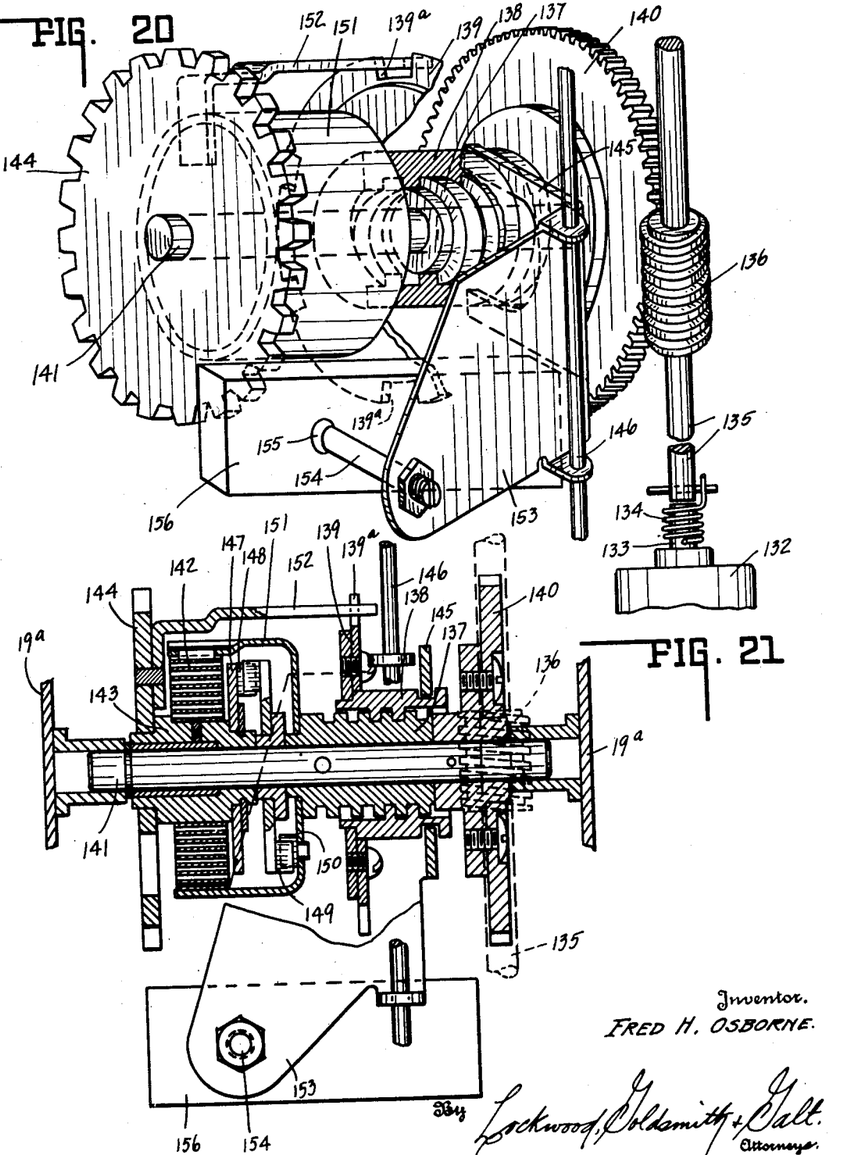
Fig. 20 is a perspective view of the modified power driving mechanism.
Fig. 21 is a central vertical section through the modified form of driving mechanism illustrated in Figs. 19 and 20.

In the modified form of the driving mechanism illustrated in Figs. 19, 20, and 21, where applicable the numerals indicating the various parts have been applied in the one hundred series as indicating parts generally corresponding in function to those employed in the above described modification.

A motor 132, through the motor shaft 133, drives the shaft 135 through a flexible spring driving connection 134. On the shaft 135 there is provided a worm 136 meshing with the worm gear 140 keyed to the shaft 141 immediately in line with the driving gear 144. The driving gear 144 meshes with and drives the gear 29 keyed to the shaft 30 in the manner and for the purpose above described. However, the gear 144 which is carried on the hub 143 is free floating and rotatable on the shaft 141. Said gear is driven through the clock spring 142 having its inner end pinned to the hub 143 and its outer end secured to the spring housing or winding drum 151. Said housing is secured to a thimble 137 which is keyed to the shaft 141 driven by the worm gear 140. Within the spring housing 151 there is a disk 147 secured to and rotatable with the hub 143. Said disk is provided with a lateral projection 148 adapted to engage with a lateral projection on the disk 149 which is freely rotatable about said shaft. The disk 149 carries a lateral projection adapted to engage with the projection 150 secured inwardly of the drum 151.

The thimble 137 is intimately threaded to receive the internal threads of a reciprocating sleeve 138. Said sleeve carries a disk 139 having a series of peripheral notches 139a formed about its periphery. A spring adjusting arm 152 is secured to the spring driven gear 144 to extend laterally therefrom for selective engagement in one of the notches 139a. Thus, as the gear 144 is rotated through the unwinding action of the spring 142 it causes rotation of the threaded sleeve 145 relative to the thimble 137. The sleeve 138 is provided with a throat adapted to receive a yoke plate 145. The yoke plate is pivotally mounted on a supporting rod 146 through laterally bent ears and extends at right angles to a switch control plate 153, whereby said yoke plate and switch control plate are fulcrumed to swing about the rod 146. The plate 153 carries a contact pin 154 engageable with the contact button 155 mounted in the switch box 156. The switch within the box 156, of any suitable type, is connected with the electric circuit to the motor 132 for controlling the energizing of the motor.

In operation of this modification form of the driving mechanism, when the switch in the box 156 closes the circuit to the motor 132, shaft 141 is rotated through the worm and worm gear 136, 140. With the shaft, the threaded thimble 137 rotates and since the gear 144 is held by its associated mechanism against rotation, the threaded sleeve 145 will be screwed to the left as shown in Figs. 20 and 21. As the sleeve is thus moved to the left, it will carry the yoke 145 with it which will swing the plate 153 and pin 154 in a direction away from the switch button 155. At the same time the thimble 137 will cause the spring housing 151 to wind up the clock spring. The parts are so formed and adjusted that upon sufficient revolutions being transmitted to wind up the clock spring, the pin 154 will have been moved outwardly sufficiently to permit the switch button 155 to break the circuit and stop the motor 152. With the clock spring thus unwound the driving gear 144 is under driving tension.

For each operation of the program key 17, as above described, the indexing mechanism will permit the gear 144 to rotate a one-sixth revolution under the driving tension of the clock spring. As the clock spring unwinds in driving the gear 144 rotation is transmitted to the disks 147 and 149 which, after two full revolutions, will cause the spring housing 151 to be rotated. The thimble 137 will then be rotated to screw the sleeve 138 in the opposite direction or to the right, as shown, which action will swing the plate 153 and pin 154 into actuating engagement with the switch button 155. Through suitable timing by properly setting the arm 152 in a selected notch 139a of the disk 139 the switch button 155 will be actuated to close the circuit to the motor 132 as the clock spring 142 finally reaches its unwound position. Thereupon the motor 132 will again drive the spring housing to rewind the spring for further and continued driving operation of the gear 144.

Figure 22:
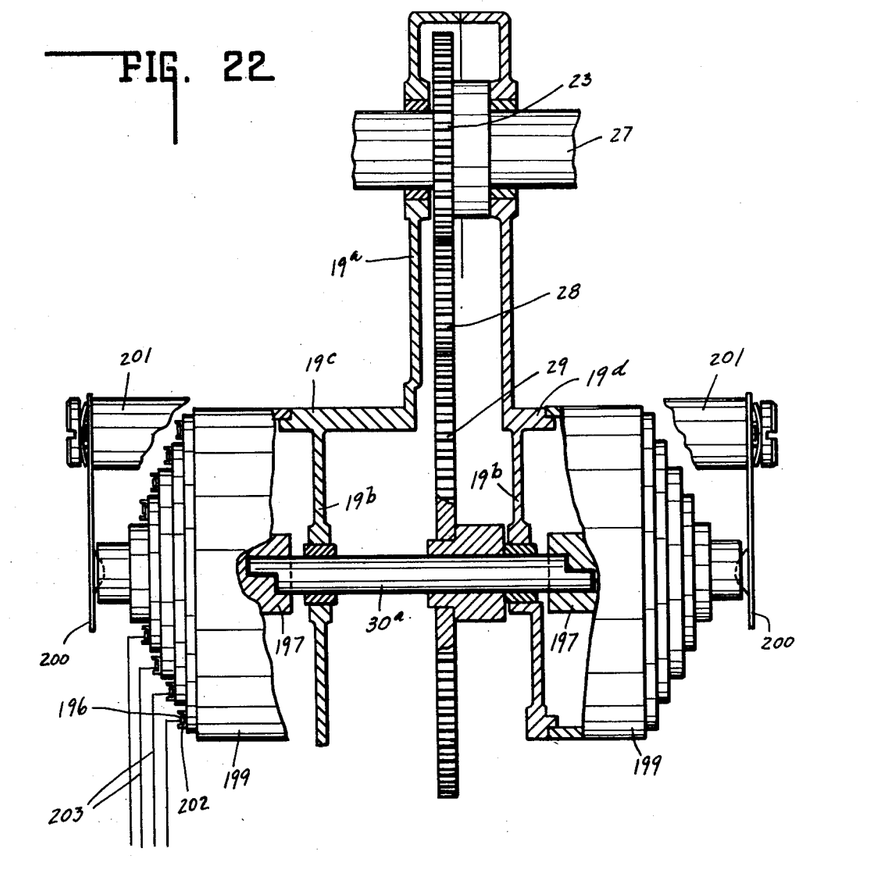
Fig. 22 is a central vertical section through a modified form of switch control mechanism with parts in elevation and portions thereof broken away.
Figure 23:
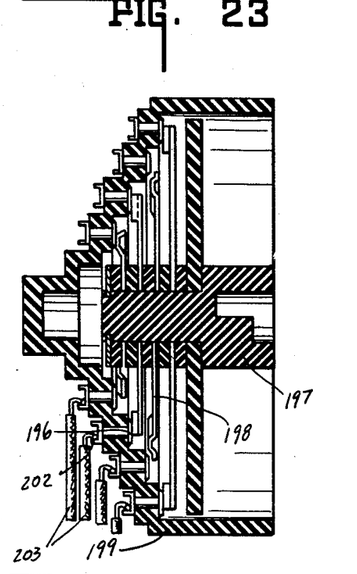
Fig. 23 is a central vertical section through one of the contact cups and commutators of the switch control mechanism shown in Fig. 22.
Figure 24:
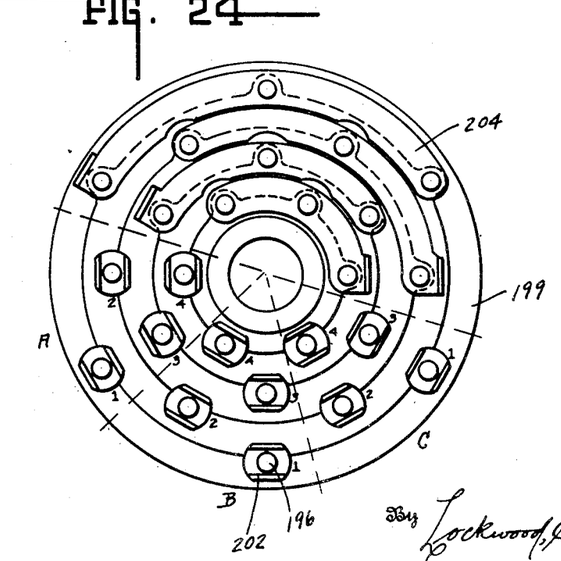
Fig. 24 is a front elevation of one of the contact cups as shown in Figs. 22 and 23.
Figure 25:
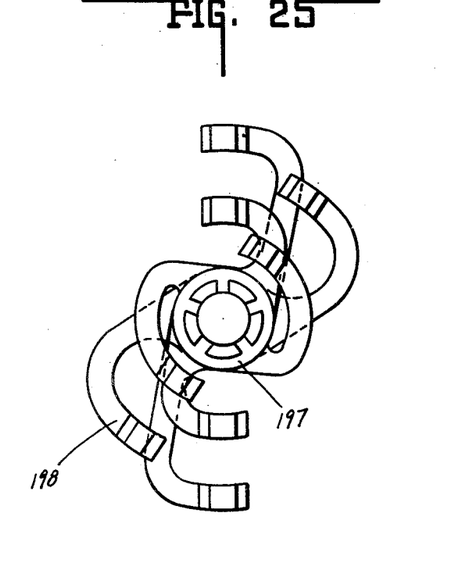
Fig. 25 is a front elevation of one of the commutators for the switch control mechanism as shown in Fig. 23.

In the modified form of the selector switch as shown in Figs. 22, 23, 24, and 25, the aligned groups of selector switches 96 shown in Fig. 24 with the associated cam sleeve 97 and cam lobes 98 are replaced by a pair of commutators. The shaft 30 above described is replaced by a short shaft 30a upon which the gear 29 is keyed. The end plates 19, as above described, are replaced by end plates 19a which are more closely associated as shown in Fig. 22. The shaft 30a is supported in bearings provided in the web members 19b and have their ends flattened to be received in and keyed to the hubs 197 carrying the commutator arms 198 (Figs. 23, 25).

Removably supported on the bosses 19c and 19d of the frame structure there are mounted the contact cups 199, respectively, said cups being yieldingly held in fixed relation to the frame by pressure of the resilient spring arms 200 carried on the ends of the studs 201 extending outwardly from said frame structure on each side of the gear 29. The outer face of each of the contact cups is formed with inner and outer annular offset steps within each of which one of the commutator arms 198 is adapted to rotate. In annular arrangement about each of the stepped portions of the cup there are a series of contacts 196 having outer contact plates 202 each connected to a selector wire 203. Thus, as the gear 29 is rotated the commutator arms 198 will be swept about the contact cup into and out of engagement with the respective contacts 196.

As will be noted in Fig. 23 there are four annular series of contacts, one series for each of the selector keys 16. As there are two sets of four selector keys 16 (Fig. 1) there are two sets of four annular series of contacts 196, one in each of the opposed contact cups 199.

It will also be noted in Fig. 24 that there are six contacts 195 in each annular series, but three of which are bridged by the respective bridges 204. This leaves three effective groups of four contacts each as indicated by dotted lines and the numbers 1–4 in Fig. 24. The three groups of contacts correspond with the three program faces of the prisms 21. One of the contact cups and its associated commutator arms is effective in respect to the selections 1, 2, 3, and 4 indicated on the left hand side of Figs. 1 and 2. The opposed cup is effective in respect to the selections indicated as numbers 5, 6, 7, and 8 on the right-hand side of Figs. 1 and 2.

It will be observed in Fig. 25 that the commutator arms are of varying lengths, one for each of the contacts numbered 1, 2, 3 and 4, respectively in Fig. 24. The contact ends of the commutator arms are arranged in relative relation to the respective groups of the contacts numbered 1, 2, 3, and 4.

By means of this arrangement, upon the gear 144 driving the gear 29 on shaft 30a a one-sixth revolution, it will move the commutator arms from one segment A (Fig. 24) to the next segment B, at the same time rotating gear 23 and the panels 12 of prisms 21 upon a one-third revolution to present that panel corresponding with segment B. The next such movement as affected by pressing the program key 17 to permit a one-sixth revolution of gear 29 will bring up the third panel 12 of the prisms 21 corresponding to the segment C. Such positions place the contacts 1, 2, 3, and 4 of the selected segment of the corresponding panel 12 in position for closing the selected circuit through depressing a selector key 16 to close a circuit through one of the wires 203 leading to the selection corresponding to the particular segment A, B, or C and particular contacts thereof 1, 2, 3, or 4.

It will, therefore, be observed that through a simplified commutator structure readily removable and replaceable on the mechanism, and more convenient for wiring as well as reducing the over-all length of the mechanism as shown in Fig. 22 over that shown in Fig. 14, the same action and results are obtained as above described in respect to the series of switches 96 and lobes 98.

The invention claimed is:

1. A selector device for vending machines including a multipanel member movable to expose one panel at a time, a series of selections carried by each panel each having identifying indicia, a plurality of selection circuits arranged in groups, each group corresponding to the series of selections carried by a panel, one circuit in each group corresponding to one selection of said series, a manually operable master key, panel changing mechanism controlled by said key for moving said panel member to expose its next adjacent panel and condition its corresponding group of circuits, a manually operable selector key associated with one of the identifying indicia on each panel, and a selector switch operable by each selector key to close a selected one of the conditioned circuits according to its associated exposed indicia.

2. A selector device for vending machines including a multipanel program member intermittently movable to expose one panel at a time, a series of selections carried by each panel, each having identifying indicia, a plurality of selection circuits arranged in groups, each group corresponding to the series of selections carried by a panel, one circuit in each group corresponding to one selection of said series, a manually operable program key, program changing mechanism controlled by said key for moving said member to expose its next adjacent panel and condition its corresponding group of circuits, a manually operable selector key associated with each exposed indicia on said member, a control switch operable by each key to close a selected conditioned circuit, and means for locking out said mechanism during actuation of said selector key.

3. A selector device for vending machines including a multipanel program member intermittently movable to expose one panel at a time, a series of selections carried by each panel, each having identifying indicia, a plurality of selection circuits arranged in groups, each group corresponding to a panel, one circuit in each group corresponding to one of said selections, a manually operable program key, program changing mechanism controlled by said key for moving said member to expose its next adjacent panel and condition its corresponding group of circuits, a manually operable selector key associated with each exposed indicia on said member, a control switch operable by each selector key to close a selected one of the conditioned circuits, and mechanism controlled by one of said keys operable during actuation thereof to lock out and prevent functioning of the other said key.

4. A selector device for vending machines including a multipanel program member intermittently movable to expose one panel at a time, a series of selections carried by each panel, each having identifying indicia, a plurality of selection circuits arranged in groups, each group corresponding to a panel, one switch in each group corresponding to one of said selections, a manually operable program key, program changing mechanism controlled by said key for moving said member to expose its next adjacent panel and condition its corresponding group of circuits, a manually operable selector key associated with each exposed indicia on said member, a control switch operable by each selector key to close a selected one of the conditioned circuits, a latching device for locking out said mechanism to prevent its operation during actuation of one of said selector keys, and a master switch to prevent closing of a conditioned circuit during actuation of said program key.

5. A selector device for vending machines including a multipanel program member intermittently movable to expose one panel at a time, a series of selections carried by each panel, each having identifying indicia, a plurality of selection circuits arranged in groups, each group corresponding to a panel, one circuit in each group corresponding to one of said selections, a manually operable program key, program changing mechanism controlled by said key for moving said member to expose its next adjacent panel and condition its corresponding group of circuits, a manually operable selector key associated with each exposed indicia on said member, a control switch operable by each selector key to close a selected one of the conditioned circuits, a master switch for controlling said circuits, and a latch operable to prevent the closing of said master switch for rendering the selection circuits inoperative during operation of said program changing mechanism.

6. A selector device for vending machines including a multipanel program member intermittently rotatable to expose one panel at a time, a series of selections carried by each panel having identifying indicia, a plurality of selection circuits arranged in groups, each group corresponding to one of said panels, one circuit in each group corresponding to one of said selections, a manually operable program key, spring actuated escapement mechanism controlled by said key for rotating said member to expose its next adjacent panel and condition its corresponding group of circuits, power means automatically operable to energize said spring, a manually operable selector key associated with each exposed indicia on said member, and a control switch operable by each selector key to close a selected one of the conditioned circuits.

7. A selector device for vending machines including a multipanel program member intermittently movable to expose one panel at a time, a series of selections carried by each panel, each having identifying indicia, a multipanel indicia member movable with said program member having a series of identifying indicia on each panel thereof corresponding with the said selection indicia, a plurality of selection circuits arranged in groups, each group corresponding to one of said panels, a manually operable program key, program changing mechanism controlled by said key for jointly moving said members to expose their next adjacent panels respectively and condition the corresponding group of circuits, a manually operable selector key associated with each exposed indicia on said indicia member, and a control switch operable by each selector key to close a selected one of the conditioned circuits.

8. A selector device for vending machines including a multipanel program member intermittently rotatable to expose one panel at a time, a series of selections carried by each panel, each having identifying indicia, a plurality of selection circuits arranged in groups, each group corresponding to the series of selections carried by one of said panels, a manually operable program key, program changing mechanism controlled by the said key for rotating said member to expose its next adjacent panel, a commutator rotatably connected with said program changing mechanism operable to condition one of said groups of selection circuits according to the panel exposed on said program member, a manually operable selector key associated with each exposed indicia on said program member, and a control switch operable by each selector key to close a selected one of the circuits conditioned by the position of said commutator.

9. A selector device for vending machines including a multipanel program member intermittently rotatable to expose one panel at a time, a numbered series of selections carried by each panel, a multipanel number member rotatable with said program member having a series of numbers on each panel thereof corresponding with the said selection numbers, a plurality of selection circuits arranged in groups, each group corresponding to one of said panels, a manually operable program key, program changing mechanism controlled by said key for jointly rotating said members to expose their next adjacent panels respectively, a commutator switch rotatable by said mechanism for conditioning a group of selection circuits corresponding to the panels exposed on said program and number members, a manually operable selector key associated with each exposed number on said number member, and a control switch operable by each selector key to close a selected one of the circuits conditioned by the position of said commutator.

10. A selector device for vending machines including a multipanel program member intermittently rotatable to expose one panel at a time, a numbered series of selections carried by each panel, a multipanel number member rotatable with said program member having a series of numbers on each panel thereof corresponding with the said selection numbers, a plurality of selection circuits arranged in groups, each group corresponding to one of said panels, a manually operable program key, program changing mechanism controlled by said key for jointly rotating said members to expose their next adjacent panels respectively, a switch control device movable by said mechanism to condition a group of selection circuits corresponding to the panels exposed on said program and number members, a manually operable selector key associated with each exposed number on said number member, a control switch operable by each selector key to close a selected one of the circuits conditioned by the position of said switch device, a master switch for controlling said selection circuits, and a latch operable to prevent the closing of said master switch for rendering the selection circuits inoperative during operation of said program changing mechanism.

11. A selector device for vending machines including a multipanel program member intermittently rotatable to expose one panel at a time, a numbered series of selections carried by each panel, a multipanel number member rotatable with said program member having a series of numbers on each panel thereof corresponding with the said selection numbers, a plurality of selection switches operable to control selection circuits and arranged in groups corresponding to each series of selections, one switch in each group corresponding to one of said panels, a manually operable program key, program changing mechanism controlled by said key for jointly rotating said members to expose their next adjacent panels respectively, a multi-lobed cam rotatable by said mechanism to simultaneously close the switches of each group corresponding to the panels exposed on said program and number members, a manually operable selector key associated with each exposed number on said number member, and a latch operable by one of said selector keys for locking out said mechanism to prevent rotation of said members when a selection is made through said selection circuit and effective to prevent closing of said master switch to prevent a selection being made during operation of said program changing mechanism.

12. A selector device for vending machines including a pair of aligned program members, each mounted on said device for intermittent rotation to expose one panel on each of said members at a time, a numbered series of selections carried by each panel, a plurality of selection circuits arranged in groups, each group corresponding to a panel and one circuit of each group corresponding to each selection thereon, a manually operable program key, program changing mechanism controlled by said key for simultaneously rotating said program members to expose their next adjacent panels and condition the groups of circuits corresponding to the exposed panels, a manually operable selector key associated with each number of the exposed selections, and a control switch operable by each selector key to close a selected one of the conditioned selection circuits.

13. A selector device for vending machines including a pair of aligned program members, each removably mounted on said device for joint rotation to expose one pair of aligned panels at a time, a numbered series of selections carried by each panel, a corresponding pair of aligned multipanel number members rotatable with said program members having a series of numbers on each panel thereof corresponding with the said selection numbers, a plurality of selection circuits, a selection switch for each circuit, said selection switches being arranged in groups corresponding to each series of selections, one switch in each group corresponding to one of said pairs of panels, a manually operable program key, program changing mechanism controlled by said key for rotating said members to expose their next adjacent pairs of panels and close a corresponding switch of each group, a manually operable selector key associated with each exposed number on said number members, and a control switch operable by each selector key to close the selection circuit through the closed selection switch of its group.

14. A selector device for vending machines including a pair of aligned program members, each removably mounted on said device for joint rotation to expose one pair of aligned panels at a time, a numbered series of selections carried by each panel, a corresponding pair of aligned multipanel number members rotatable on said program members having a series of numbers on each panel thereof corresponding with the said selection numbers, a plurality of selection circuits, a selection switch for each circuit, said selection switches being arranged in groups corresponding to each series of selections, one switch in each group corresponding to one of said pairs of panels, a manually operable program key, program changing mechanism controlled by said key for rotating said members to expose their next adjacent pairs of panels and close a corresponding switch of each group, a manually operable selector key associated with each exposed number on said number members, a control switch operable by each selector key to close the selection circuit through the closed selection switch of its group, a master switch for controlling said selection circuits, and locking out mechanism operable by actuation of a selector key to prevent functioning of said program changing mechanism while a selection is being made, and operable by actuation of said program key to prevent closing of said master switch whereby no selection will be made during the program changing operation.

15. A selector device for vending machines including a multipanel program member intermittently movable to expose one panel at a time, a series of selections carried by each panel, each having identifying indicia, a multipanel indicia member rotatable with said program member having a series of identifying indicia on each panel thereof corresponding with the said selection indicia, a plurality of selection switches operable to control selection circuits and arranged in groups corresponding to each series of selections, one switch in each group corresponding to one of said panels, a manually operable program key, a spring actuated escapement mechanism controlled by said key in driving engagement with said members for rotating them simultaneously to expose their next adjacent panels, power means automatically operable to energize the driving spring of said mechanism, a multi-lobe cam rotatable with said members having lobes spaced thereon for engaging and closing corresponding selection switches in each group according to the panels exposed, a manually operable selector key associated with each exposed indicia on said indicia member, a control switch operable by each selector key to close the selection circuit through the closed selection switch of its group, a master switch for controlling said selection circuits, and a latch operable by the actuation of one of said selector keys to engage said escapement mechanism to prevent operation thereof during a selection and movable to close said master switch, said escapement mechanism operating to prevent movement of said latch to close said master switch when actuated by said program key whereby no selection will be made therethrough during rotation of said members to present a new program.

16. A selector device for vending machines including a multipanel program member intermittently rotatable to expose one panel at a time, a numbered series of selections carried by each panel, a hollow translucent multipanel number member rotatable with said program member having a series of illuminated numbers on each panel thereof corresponding with the said selection members, means for mounting said number member on said device including a stationary lamp support electrically connected therethrough for illuminating the exposed panel of said member, a plurality of selection switches operable to control selection circuits and arranged in groups corresponding to each series of selections, one switch in each group corresponding to one of said panels, a manually operable program key, program changing mechanism controlled by said key for simultaneously rotating said members to expose their next adjacent panels and close a corresponding switch of each group, a manually operable selector key associated with each exposed number on said number member, and a control switch operable by each selector key to close the selection circuit through the closed selection switch of its group.

17. A selector device for vending machines comprising a member having a plurality of panels, each panel carrying a series of name plates each identified by an indicia, an indicia member having a corresponding number of panels each carrying thereon corresponding indicia, means interconnecting said members, a manually operable element movable to simultaneously bring the corresponding panels of each member into exposed position and condition a corresponding group of selection circuits, one circuit for each name plate and indicia, and a manually operable selector switch associated with and corresponding to each exposed indicia for closing a selected one of the conditioned selection circuits.

18. A selector device for vending machines comprising a rotatable drum having a plurality of panels carried thereby movable into and out of exposed position upon rotation thereof, each of said panels carrying a series of identifying indicia, an indicia drum associated and rotatable therewith having a corresponding number of panels each carrying a series of like indicia to those of the first mentioned drum, manually operable means connected with said drums for rotating them to simultaneously expose their corresponding panels, an electric circuit corresponding to each indicia adapted to be conditioned for closing upon its indicia being exposed, and a manually operated switch for each of the exposed indicia operable to close a selected one of the conditioned circuits.

19. A selector device for vending machines comprising a member carrying a plurality of identifying panels adapted to have one panel at a time move to exposed position, a series of indicia on each panel, a group of electric selection circuits for each panel and one circuit of said group for each indicia thereof, manually operable means for selectively exposing one of said panels and conditioning its group of circuits, and a manually operable switch corresponding to the indicia of the exposed panel operable to close a selected conditioned circuit.

20. A selector device for vending machines comprising a member having a series of panels each adapted to be moved into and out of exposed position, each of said panels carrying a series of selections, a program actuating member operably connected with said member for moving it to expose a selected panel, a group of electric selection circuits for each panel adapted to be conditioned upon said panel being exposed, one circuit of each group corresponding to one of the selections carried thereon, and a series of switches, each corresponding to one of the selections on the exposed panel, manually operable to close a conditioned selection circuit corresponding to said switch and its identifying indicia.

FRED H. OSBORNE.